United States Patent
Kulkarni et al.

(10) Patent No.: US 9,798,584 B1
(45) Date of Patent: Oct. 24, 2017

(54) METHODS AND APPARATUS FOR IO SIZING BASED TASK THROTTLING

(71) Applicant: EMC Corporation, Hopkinton, MA (US)

(72) Inventors: Gururaj Kulkarni, Bangalore (IN); Vladimir Mandic, San Jose, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/869,777

(22) Filed: Sep. 29, 2015

(51) Int. Cl.
*G06F 9/46* (2006.01)
*G06F 9/50* (2006.01)
*G06F 9/48* (2006.01)

(52) U.S. Cl.
CPC .......... *G06F 9/5011* (2013.01); *G06F 9/4881* (2013.01)

(58) Field of Classification Search
None
See application file for complete search history.

(56) References Cited

U.S. PATENT DOCUMENTS

| 8,560,788 | B1 * | 10/2013 | Sreedharan | G06F 11/1461 707/640 |
| 2016/0048350 | A1 * | 2/2016 | Gostev | G06F 3/0619 711/162 |

OTHER PUBLICATIONS

EMC NetWorker "Performance Optimization Planning Guide," Jun. 2014.*

* cited by examiner

*Primary Examiner* — Sisley Kim
(74) *Attorney, Agent, or Firm* — Blakely, Sokoloff, Taylor & Zafman LLP

(57) ABSTRACT

Methods and apparatuses select service tasks according to allocations of an available usage rate of a common processing resource are described. An ordering relationship is updated among the service tasks. E service task can have a rate of usage of the common processing resource. Each service may be associated with one of multiple task types. An allocation of the available rate of usage may be determined among the task types. The allocation can indicate a portion of the available rate of usage for each task type. The service tasks may be selected according to the allocation and the ordering relationship. At least one of the selected service tasks is associated with each task type associated with the service tasks.

25 Claims, 6 Drawing Sheets

| Service Operation | Small Workload | Medium Workload | Large Workload |
|---|---|---|---|
| Concurrent Backups | 30 | 80 | 170 |
| Bootstrap Backups | 50 | 200 | 500 |
| Backup Group Startup | 50 | 150 | 250 |
| Volume Management | 0 | 25 | 100 |
| Large Network Data Management Protocol Backup | 100 | 100 | 200 |
| Standard Daily Maintenance Tasks | 40 | 75 | 100 |
| Large Internal Database Maintenance | 0 | 100 | 200 |
| Purge Operation | 50 | 150 | 300 |
| Network Management Console Reporting | 50 | 75 | 100 |
| Recovery | 30 | 200 | 500 |

Updating an ordering relationship among a plurality of service tasks, wherein execution of each service task depends on a usage of a common processing resource, each service task having a rate of usage of the common processing resource, each service task associated with one of a plurality of task types, the common processing resource having an available rate of usage  401

Determining an allocation of the available rate of usage among the task types, the allocation indicating a portion of the available rate of usage for each of task type associated with the service tasks  403

Selecting one or more of the service tasks for execution according to the allocation and the ordering relationship, wherein at least one of the selected service tasks is associated with each task type associated with the service tasks  405

Executing the selected service tasks to update data stored in a device via the common processing resource  407

Fig. 4

METHODS AND APPARATUS FOR IO SIZING BASED TASK THROTTLING

FIELD OF THE INVENTION

Embodiments of the present invention relate generally to backup operations for data storage systems. More particularly, embodiments of the invention relate to scheduling backup operations for servers.

BACKGROUND

Backup servers may be part of the master piece in data protection suite. Usually, back up servers are responsible for ensuring smooth operations backup related operations such as scheduling, controlling and monitoring of backup, recovery and replication jobs; server maintenance operations (e.g. catalog maintenance and garbage collection); maintaining integrity of backup operation related data (e.g. catalog database or catalog directory) to avoid data corruption; resource allocations, authentication and authorization; and disaster recovery operations, etc. The backup server has to be more resilient and responsive to ensure successful completion of these operations which could be sequential or concurrent in nature.

Under normal conditions, operations are performed with concurrency that does not have backup server impact and remaining operations are sequentialized. However, busy environments can result in higher concurrency of operations that cause stress and load on the backup server. As a result, contention to access the backup operation related data (e.g. catalog database) among these operations may arise, even if processor resources and memory usage are properly allocated to perform these operations. Backup operations may hang or even abort (e.g. due to timeout settings) with serious contentions. Typically this is handled with built-in operation retry mechanism that hides the operational failures from end-user, but does not solve the actual problem.

BRIEF DESCRIPTION OF THE DRAWINGS

Embodiments of the invention are illustrated by way of example and not limitation in the figures of the accompanying drawings in which like references indicate similar elements.

FIG. 3 shows an example of IO sizing requirements for task throttling according to one embodiment of the invention;

FIG. 4 is a flow diagram illustrating one embodiment of a process to throttle tasks based on IO sizing according to one embodiment of the invention;

DETAILED DESCRIPTION

Figure 1:
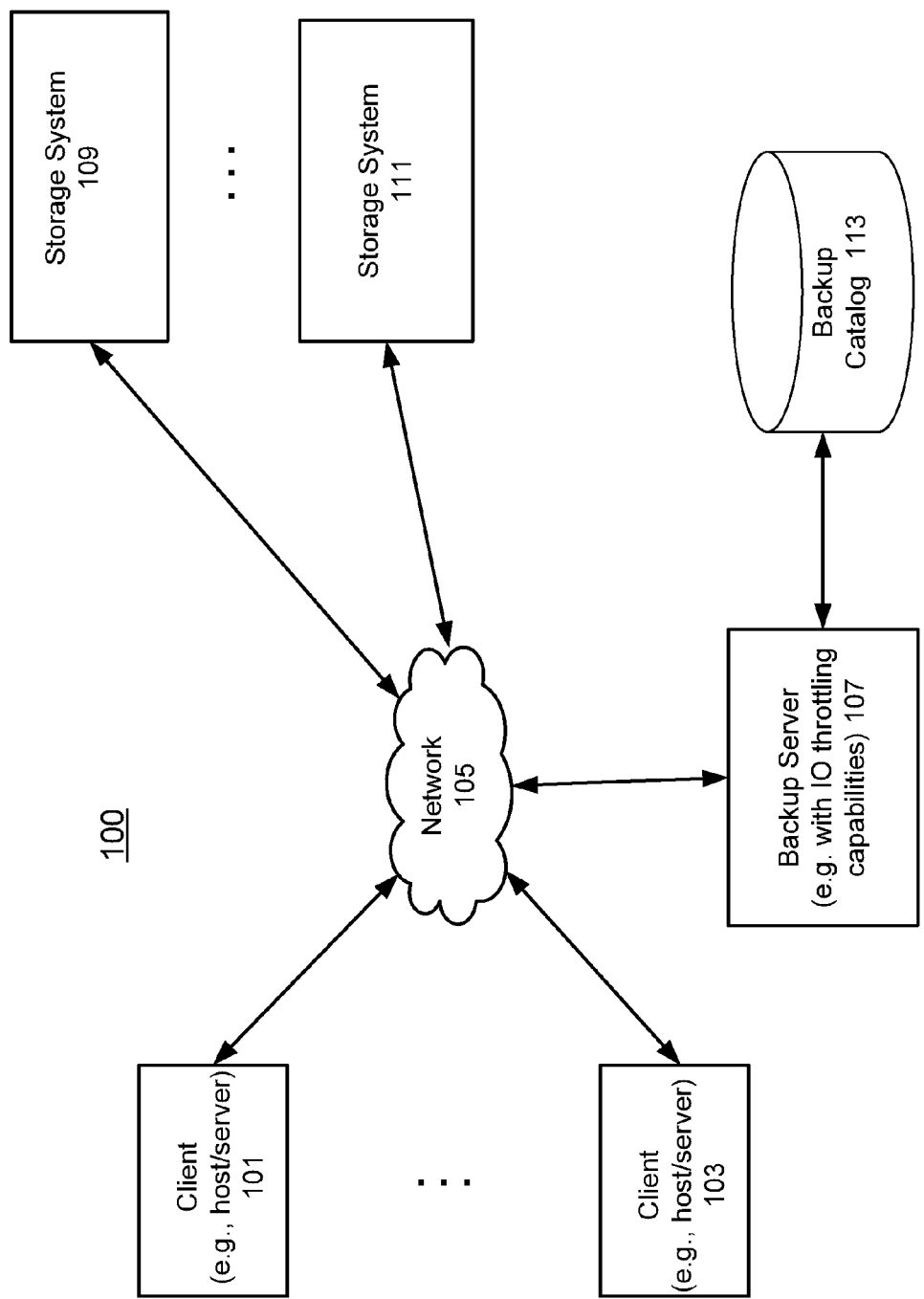
FIG. 1 is a block diagram illustrating a storage system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

In one embodiment, IO (input/output) sizing throttling of backup operations can empower backup applications with sufficient efficiency to protect huge and massive data in most of data centers. The amount of time saved can allow administers in data protection service to achieve challenges in RTO (Recovery Time Objective, e.g. targeted duration of time and a service which must be restored after a disaster or disruption) and RPO (Recovery Point Objective, e.g. maximum targeted period in which data might be lost). IO sizing based throttling can provide a mechanism to classify backup related operations into separate types of different importance or priorities and schedule executions of these operations accordingly to avoid severe contention on accessing common underlying processing infrastructure.

In one embodiment, IO sizing based throttling can prevent response time of a backup application to deviate (e.g. over a period of time) from its original targeted value due to various factors related, for example, to the massive scale (or size) of catalog database requiring constant updating during backup and retrieve operations; changes of underlying processing resource infrastructures; and/or occurrences of frequent system stalling (or becoming nonresponsive) resulting from concurrent backup operations competing for limited processing resources.

Information (e.g. dynamic or static) on IO sizing based on underlying data processing infrastructure can allow an application to make throttling decisions among multiple operations (e.g. service tasks) competing for limited resources (e.g. of the infrastructure). For example, a server infrastructure may include a device storing a backup operation related database or backup catalog with an overall rate of usage, such as maximum IOPS (input/output operations per second) as around 400 (or other suitable rate). Each backup job (or task) scheduling by the server may require access to the backup catalog with about 3 IOPS on average. A particular backup operation, such as a bootstrap backup operation may require access to the backup catalog with a usage rate (e.g. depending on size of the backup catalog) around 200 IOPS. These IO sizing requirements may be sample illustrations for data backup related operations performed in an exemplary server, such as NetWorker® from EMC® Inc. Other sizing requirements may be applicable for various data processing operations in various hardware configurations and/or operating environments.

IO sizing information can allow a backup server (e.g. a backup application running in the backup server) to determine whether to perform throttling to ensure smooth backup operations by limiting the total IOPS among concurrently running operations to be substantially within the maximum IOPS available. The server can avoid running multiple backup operations in an overloaded manner, such as 500 concurrent backup operations (requiring 1500 IOPS) or concurrent bootstrap operation and 100 backup operations (requiring 500 IOPS), which may cause system unresponsiveness (e.g. when disk response time is greater than a certain threshold, such as 5 ms, to cause operation time out) due to IO bottleneck or IO starvation.

In one embodiment, IO size based throttling may be based on available IOPS from the underlying infrastructure (e.g. storage stack where catalog resides) and priorities identified or configured for various backup operations (or tasks). Available IOPS to support a backup catalog may be calculated or determined statically or dynamically. Priorities of various backup related operations may be configured or identified in an application based on heuristics established according to relationships (or dependencies) among these operations and/or capabilities of the underlying infrastructures including storages and compute stacks (or systems).

For example, each client request to perform a backup related operation may be associated with importance or criticality factor based on the priority. In one embodiment, scheduling of backup requests may be assigned with an importance not lower than other backup related operations. Priority may be dynamically (e.g. based on age) adjusted preemptively. As an example, if particular operation has low priority, this low priority may be changed (e.g. made bumped up) based on aging of a request to perform this particular operation to avoid forcing low priority tasks to sit idle for long periods of time. Alternatively or optionally, priorities of backup related operations may be determined based on required IOPS (or usage rate) on a common processing resource, such as storage disks, to avoid starvation of requests competing for the common processing resource.

FIG. 1 is a block diagram illustrating a storage system according to one embodiment of the invention. Referring to FIG. 1, system 100 includes, but is not limited to, one or more clients 101-103 communicatively coupled to backup server 107 and storage systems 109-111 over network 105. Clients 101-103 may be any type of clients such as a server, a hosting device, a personal computer (e.g., desktops, laptops, tablets, etc.), a "thin" client, a personal digital assistant (PDA), a web enabled appliance, a gaming device, a media player, or a mobile phone (e.g., smartphone), etc. Alternatively, any of clients 101-103 may be a primary storage system that provides storage to other local clients, which may periodically back up the content stored therein to a backup storage system, such as storage system 109-111.

Network 105 may be any type of networks such as a local area network (LAN), a wide area network (WAN) such as the Internet, a fiber network, a storage network, or a combination thereof, wired or wireless. Backup catalog 113 may include a database storing backup operation related data between clients 101-103 and storage systems 109-111. Backup catalog 113 may be locally or remotely (e.g. via network 105) coupled to backup server 107. In one embodiment, clients 101-103 may be in physical proximity or may be physically remote from one another. Storage systems 109-111 and backup server 107 may be located in proximity to one, both, or neither of clients 101-103.

Storage systems 109-111 may include any type of server or cluster of servers to provide backup services. For example, storage systems 100-111 may be storage servers used for any of various different purposes, such as to provide multiple users with access to shared data and/or to back up data (e.g., mission critical data). In one embodiment, storage systems 109-111 may storage devices such as a hard disk, a tape drive, a semiconductor memory, a plurality of storage devices such as a redundant array system (e.g., a redundant array of independent disks (RAID)), a system for storage such as a library system or network attached storage system, or any other appropriate storage device or system.

Backup server 107 may perform backup service operations to back up and recover data on clients 101-103. Completion of data backup or recovery between clients 101-103 and storage systems 109-111 may require performing backup related operations via backup server 107. Backup service operations may include authentication, scheduling, tracking, logging, monitoring, management, or any other applicable service operation. In one embodiment, backup server 107 can perform IO sizing based throttling on backup service operations which may be concurrently running competing for access of backup catalog 113.

Figure 2:
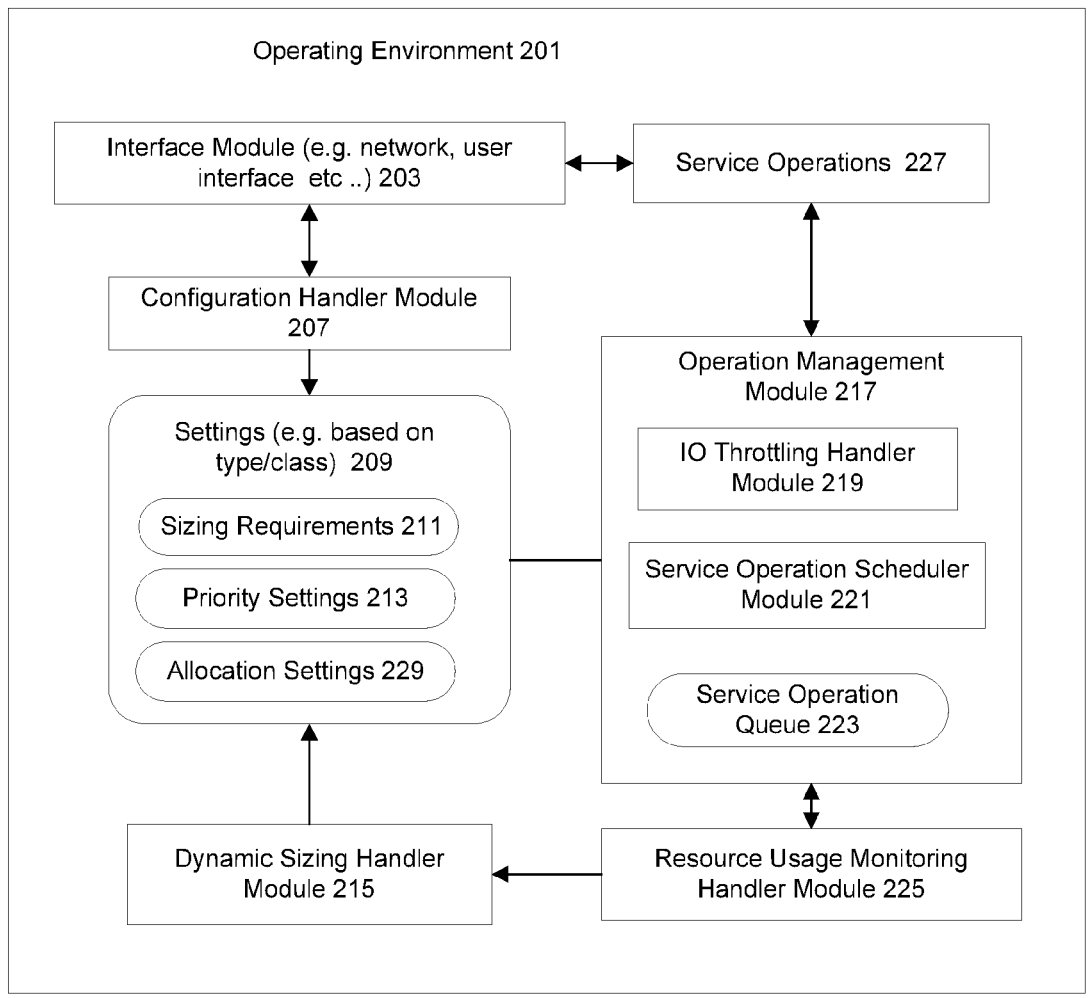
FIG. 2 is a block diagram illustrating system components for task throttling based on IO sizing according to one embodiment of the invention.

FIG. 2 is a block diagram illustrating system components for task throttling based on IO sizing according to one embodiment of the invention. For example, system 200 may be hosted in backup server 107 of FIG. 1. Operating environment 201, such as an operating system running in a server device, may include service operations 227 instantiated to perform a variety of backup related service operations. Each service operation may be running, for example, as one thread or one process. Each service operation may be activated according to a request received from a client, such as client 101-103 of FIG. 1. Alternatively, a service operation may be instantiated by a service schedule or on request by an administrator via interface module 203.

Service operations may be executed to access an underlying storage subsystem, such as backup catalog 113 of FIG. 1, via interface module 203. Examples of service operations requiring IO resources via interface module 203 may include backup scheduling operations, clone list building operations, bootstrap operations, maintenance operations, database purging operations, database flushing operations or other applicable operations, etc.

Settings 209 may include characteristics (statically configured or dynamically updated) associated with service operations including service operations 227. For example, sizing requirements 211 may specify a level of usage requirements to perform a type of service operations, such as IOPS, memory usage, processing cycle usage, network interface usage or other applicable rate of usage of processing resources. Priority settings 213 may indicate a criticality value representing a priority for each type of service operations.

In some embodiments, service operations may be classified into multiple types (or classes, categories). Each service operation may belong to a single one of the types. For example, the types of service operations may include, backup type, clone type, bootstrap type, maintenance type, purge type and/or other applicable types. In one embodiment, priority settings 213 may indicate priorities from high (e.g. 1) to low (e.g. represented as an integer higher than 1) for different types of service operations as backup type (priority 1), backup type, clone type (priority 2), bootstrap type (priority 3), maintenance type (priority 4), purge type (priority 5), etc. Multiple instances (or instantiations) of a common executable for a service operation may belong to a common type irrespective of (or independent of), for example, which applications, file systems, snapshots of data or other processing entities (e.g. data or code) associated each instance.

Sizing requirements 211 may specify, statically or dynamically, resource usage requirements associated with each applicable service operation. Resource usage requirements may be related to a particular processing resource, such as performing transaction or input/output activities to access a database, such as backup catalog 113 of FIG. 1. Resource usage requirements may vary depending on different service operations, current processor loads, current memory usage, current network congestions, or other applicable environmental factors. Sizing requirements 211 may define how a required rate of resource usage for a service operation relates to these factors.

For example, resource usage requirements of each service operation may depend on workload (e.g. number of clients associated, number of jobs to perform per unit time or amount of data processed per unit time etc.) of a server, such as backup server 107 of FIG. 1. In some embodiments, workload may be classified into multiple types, such as small workload, medium workload or high workload. The workload of a server handling about 1000 sessions (or service operations) per day for 100-250 clients may be classified as a small workload; the workload of a server handling about 10000 backup sessions per day for 250-500 clients may be classified as medium workload; the workload for a server handling about 50000 backup sessions per day for more than 500 clients may be classified as large workload.

To illustrate, FIG. 3 shows an example of IO sizing requirements for task throttling. Table 300 may include information specified in sizing requirements 211 of FIG. 2. Column 301 may indicate examples of service operations. Columns 303, 305, 307 may correspond to IO sizing requirements under different workloads for each service operation listed in column 301. As shown, IO sizing requirements, such as IOPS, for backup group startup operation 309 can be specified as 50, 150, 250 for small workload, medium workload and large workload separately. Required IO sizing may increase as workload increases in a server.

Turning back to FIG. 2, settings 209 may be dynamically updated, for example, via dynamic sizing handler module 215. Alternatively or optionally, settings 209 may be configured via configuration handler module 207, for example, by an administrator or configuration device locally or remotely coupled. Dynamic sizing handler module 215 can update information included in settings 209 according to run time states (or environment factors) monitored or tracked by resource usage monitoring handler module 225. In some embodiments, resource usage monitoring handler module 225 can record in real time IO transactions (e.g. sending/ receiving network data) via interface module 203 for each service operation which is running or executed.

System 200 may include operation management module 217 to instantiate, schedule and/or activate service operations 227, for example, in response to client requests received. Operation management module 217 may initiate service operations automatically according to server configurations. Each service operation may be performed via a thread or a process in the operating environment 201. Multiple service operations may be instantiated and/or executed at the same time.

In one embodiment, initiated or instantiated service operations may be scheduled for activation to access a processing resource, such as IO operations, via service operation scheduler module 221. For example, service operations waiting to be selected for execution may be ordered in service operation queue 223 having an ordering relationship. For example, service operation scheduler module 221 may prioritize service operations based on required IOPS, types of service operations, and/or an aging factor. IOPS requirements for each service operation may be identified via sizing requirements 211. The ordering relationship may be dynamically established to allow an instance of a service operation arrived (or activated) earlier to pre-empt a later arrived instance of the service operation. As a result, service operations may be ordered in service operation queue 223 based on their priority and their arrival time.

The aging factor may be considered for every service operation of service operation queue 223. For example, if two service operations namely backup and maintenance operations are instantiated concurrently at time T0, the maintenance operation may be deferred based on IOPS availability. However, additional maintenance operations which arrive at a later time T1>T0, higher priority may be given to older maintenance operations in queue since time T0.

In one embodiment, the ordering relationship may be assigned based on a value obtained via an expression such as:

priority (user defined)*age (in seconds, normalized to a factor)/cost (in IOPS) For example, user defined priority of a service operation may be specified in priority settings 213, including a priority value for a type of this service operation. Age may be related to a difference between a current time and an arrival time associated with the service operation. Cost may include number IOPS required for the service operations, for example, specified according to sizing requirements 211.

IO throttling handler module 217 may select which service operations from service operation queue 223 to activate according its associated ordering relationship and/or current resource availability. IO throttling handler module 217 may perform the selection in response to detecting completions of active service operations and/or arrival of new service operations. Service operations 227 may include currently activated (or executed) service operations. The amount of resource usage currently available may be tracked via resource usage monitoring handler module 225.

In one embodiment, selection which service operations, such as service operations 227, to activate may be based on information specified in allocation settings 229. Depending on which types of service operations are present waiting to be activated in service operation queue 223, portions of available resource usage allocated for each applicable type of class of service operations in queue (e.g. ordered via service operation queue 223) may be determined according to allocation settings 229. Allocation settings 229 may specify usage allocation for the current maximum resource usage (e.g. based on infrastructure of a processing device regardless which portions are being occupied by currently activated service operations) and/or for the current available resource usage (e.g. depending on the portion of the current maximum resource usage which is not used by the currently activated service operations).

As an illustration, assuming the current availability of IOPS detected (or determined) for a backup catalog (e.g. via interface module 203) is 1000 (e.g. max IOPS). If backup and maintenance operations (e.g. two types of service operations) are triggered (or arrive), priorities allocated for these operations may be based on their IO contention on the backup catalog. Allocation settings 229 may specify that allocation of IOPS (e.g. maximum or available) usage among backup and maintenance types of service operations (e.g. based on service operation queue 223) may be guided as 80% for backup service operations and 20% for maintenance operations. Alternatively, distributions of IOPS usage among backup, bootstrap and maintenance operations may be specified as 60%, 30% and 10%. Different distributions may depend on different combinations of service operations.

In this example, backup operations (or service operations of backup type) is of higher priority than maintenance operations (or service operations of maintenance type), for example according to the above listed priority expression, backup service operations may be scheduled for activation. IOPS resource usage to access the backup catalog by these activated backup operations (or jobs) may be monitored. If IOPS reaches to 80% of overall IOPS resource usage, backup service operations may be throttled, e.g. via IO throttling handler module 219.

Similarly, maintenance operations or maintenance service operations of maintenance type may be started or activated. IOPS usage by the maintenance operations may be monitored, e.g. via resource usage monitoring handler module 225. If resource usage of IOPS resource (e.g. maximum or available) by maintenance operations reaches 20%, then IO throttling handler module 219 may throttle these operations.

If one or more backup operations complete while maintenance operations are still active, IO throttling handler module 219 may reprioritize the existing task (maintenance operations in this case) and allocate the maximum IOPS or all available IOPS to maintenance operations. Calculation of IOPS resource usage and prioritization of service operations may be performed dynamically while service operations (e.g. of any type) are being executed.

In one embodiment, operations management module 217 may calculate the maximum IOPS usage resource provided by the underlying storage and/or file systems for the directory where backup catalog resides, for example, via backup operation catalog 113 of FIG. 1. For example, the backup catalog may be represented as "/nsr" if operating environment 201 includes a UNIX® operation system or "<default backup install directory>/nsr" folder if operating environment 201 includes Windows® based operation system. These representations may be illustrated for an exemplary operating environment, such as NetWorker® from EMC® Inc. Other representations may be applicable in various hardware configurations and/or operating environments.

If the underlying file system (e.g. where "/nsr" resides in a UNIX® operation system to store backup catalog) of operating environment 201 provides around a maximum resource (IO resource) usage as around 1000 IOPS, operations management module 217 may distribute IOPS among service operations by slicing the maximum 1000 IOPS across activated service operations. The maximum IOPS resource usage may by shared or divided among these service operations and each service operation may be limited with its shares of the overall IOPS to access the backup catalog to reduce or eliminate runtime congestions or contests for the backup catalog among these service operations.

In one embodiment, if there is only one type of service operations (e.g. backup type) running at any given time, then 100% share of IOPS resource usage can be allocated to this type of service operations (e.g. backup type of service operations). If there is another type of service operations (e.g. maintenance type of service operations) running along with service operations of the backup type, then service operations of the backup type may be allocated with about 80% of the total IOPS resource usage and service operations of the maintenance type may be allocated with 20% of the total IOPS resource usage.

While these service operations are actively running, in one embodiment, if service operations of bootstrap type start, then shares of IOPS resource usage allocated for currently running service operations may be recalculated (e.g. via IO throttling handler module 219) to allow newly arrived service operations of the bootstrap type to start execution. For example, if types of service operations started (or arrived) include backup, maintenance and bootstrap types, then service operations of the backup type may be allocated with 60% of the total IOPS resource usage, the service operations of the bootstrap type may be allocated with about 30% of the total IOPS resource usage and service operations of the maintenance type may be allocated with the remaining 10% of the total available IOPS resource usage. Once bootstrap operations or backup operations complete, the allocation or distribution of the total IOPS resource usage may be recalculated for the currently running service operations.

In one embodiment, available IOPS resource usage may be divided equally among requesting service operations under a small workload type of runtime environment, e.g. as specified in column 303 of FIG. 3. For example, load pattern on a backup catalog (or catalog directory), such as backup catalog 113 of FIG. 1, in this workload type would generally be light with less likelihood to cause IO usage congestions compared with compared with load patterns of other workload types (e.g. medium or large types of workload). In comparison, service operations performed in environments of medium or large workload types may likely overlap with each other trying to access a common backup catalog and cause IO usage congestions. Distributions of IOPS resource usage in environments of medium or large workload types may depend on which types of the service operations are competing against each other.

FIG. 4 is a flow diagram illustrating one embodiment of a process to throttle tasks based on IO sizing. Exemplary process 400 may be performed by a processing logic that may include hardware (circuitry, dedicated logic, etc.), software (such as is run on a dedicated machine), or a combination of both. For example, process 400 may be performed by some components of system 200 of FIG. 2. At block 401, for example, the processing logic of process 400 may update an ordering relationship among a plurality of service tasks, for example, initiated or dispatched by operation management module 217 of FIG. 2.

In one embodiment, execution of each service task may depend on a usage or usage status of a common processing resource (e.g. commonly used by multiple server tasks). Each service task can have a rate of usage of the common processing resource. Each service task may be associated with one of a plurality of task types, which may be preconfigured or dynamically configured.

The common processing resource can have (or a limitation of) an available rate of usage depending on the underlying hardware/software infrastructure and/or runtime status. A rate of usage may be related to number of calls to access the resource, number of transactions with the resource, number of roundtrips or other applicable usage counts for the resource per unit time. For example, the common resource may include a file system storing data via a storage device.

The available rate of usage may represent a maximum number of transactions (e.g. read/write/update) allowed with the file system per unit time. The processing logic of process 400 may dynamically identify the available rate of usage of the file system. Alternatively or optionally, the processing logic of process 400 may retrieve the available rate of usage for the file system based on a configuration setting.

In one embodiment, the common processing resource may include an input/output (IO) interface to a storage device or other locally or remotely coupled device (e.g. hosting a database, storing a file system data etc.) which can be shared by multiple processing operations. A rate of usage of the common processing resource may represent a number of input/output requests to the IO interface for the transactions per unit time (e.g. a second, a millisecond, etc.)

The processing logic of process 400 can track or monitor the number of input/output requests with the common processing resource dynamically during runtime to identify currently available rate of usage of the common processing resource. For example, the maximum number of transactions with this common processing resource per unit time can be determined based on a history of the number of input/output requests tracked.

In one embodiment, the available rate of usage may be inversely related to the sum of current usage rates of a commonly used processing resource. These usage rates may be separately associated with the currently running service tasks (or service operations, jobs) which use this common processing resource. If this common processing resource inherently can support a maximum rate of transactions (or usage), the available rate of usage of this common processing resource may be no more than a value determined by the maximum rate of transactions. For example, the available rate of usage may be less than the maximum rate of usage minus the sum of current rates of usages.

In certain embodiments, the processing logic of process 400 may update the ordering relationship among the service tasks or operations based on a combination of the priority and the usage rate associated with each service task. For example, the ordering relationship may be directly related to the priority associated with each service task. In other words, the higher the priority of a type associated with a service task, the higher this service task is in the ordering relationship. Alternatively, the ordering relationship may be inversely related to the rate of usage of each service task. The higher the usage rate required by a service task, the lower this service task is in the ordering relationship.

In some embodiments, each service task may be received (or called, invoked) for execution at a time instance designated as an arrival time for the service task. The processing logic of process 400 can update the ordering relationship based on the arrival time of each service task. The ordering relationship may be directly related to the arrival time of each service task. For example, the earlier a service task arrives, the higher this service task is in the ordering relationship. The processing logic of process 400 may update the ordering relationship in response to receiving at least one of the service tasks.

At block 403, the processing logic of process 400 can determine an allocation or distribution of the available rate of usage of the processing resource among the task types associated with the running service tasks which use the processing resource. The allocation may indicate a portion of the available rate of usage for these task types. For example, the processing logic of process 400 can maintain an allocation table specifying target allocations of available usage rates for different subsets of possible task types. The target allocation may differ depending on different subsets of the tasks types present in the currently running service tasks competing for accessing a common processing resource. The processing logic of process 400 may identify which subset of task types is associated with the current service tasks to determine the desired or target allocation according to the allocation table.

In one embodiment, the target allocation may depend on a measure of current working environment, such as a work load state or other applicable state of the current runtime environment. For example, the processing logic of process 400 can divide or allocate an available usage rage of a processing resource into substantially even portions among each task type associated with the currently running service tasks if the measure indicates that a work load of the current working environment is below a threshold value.

At block 405, the processing logic of process 400 may select one or more of the service tasks for execution (e.g. to proceed to access the common processing resource) according to the allocation of the available usage rate and the ordering relationship among the service tasks. In some embodiments, the number of service tasks of the same task type to be executed may depend on the allocation, and at least one of the selected service tasks for execution that may be associated with each task type and subsequently associated with the service tasks.

The processing logic of process 400 can identify the number of service tasks of a particular task type allocated for execution from the service tasks following the ordering relationship. The number may be based on a combination of usage rates of the service tasks identified may be constrained by a portion of the available rate of usage for the particular task type indicated in the allocation. The combination can includes a sum of the usage rates of the number of service tasks identified.

In one embodiment, the processing logic of process 400 can monitor rates of usage of the common processing resources by the currently executed service tasks during runtime. The processing logic of process 400 can detect completion of a particular one of the currently executed service tasks to update the ordering relationship among the currently running service tasks. Optionally or additionally, the processing logic of process 400 may update the available rate of usage based on the rates of usage monitored for remaining ones of the currently executed service tasks which have not yet completed. At block 407, the processing logic of process 400 may execute the selected service tasks to update data stored in a device via the common processing resource.

Figure 5:
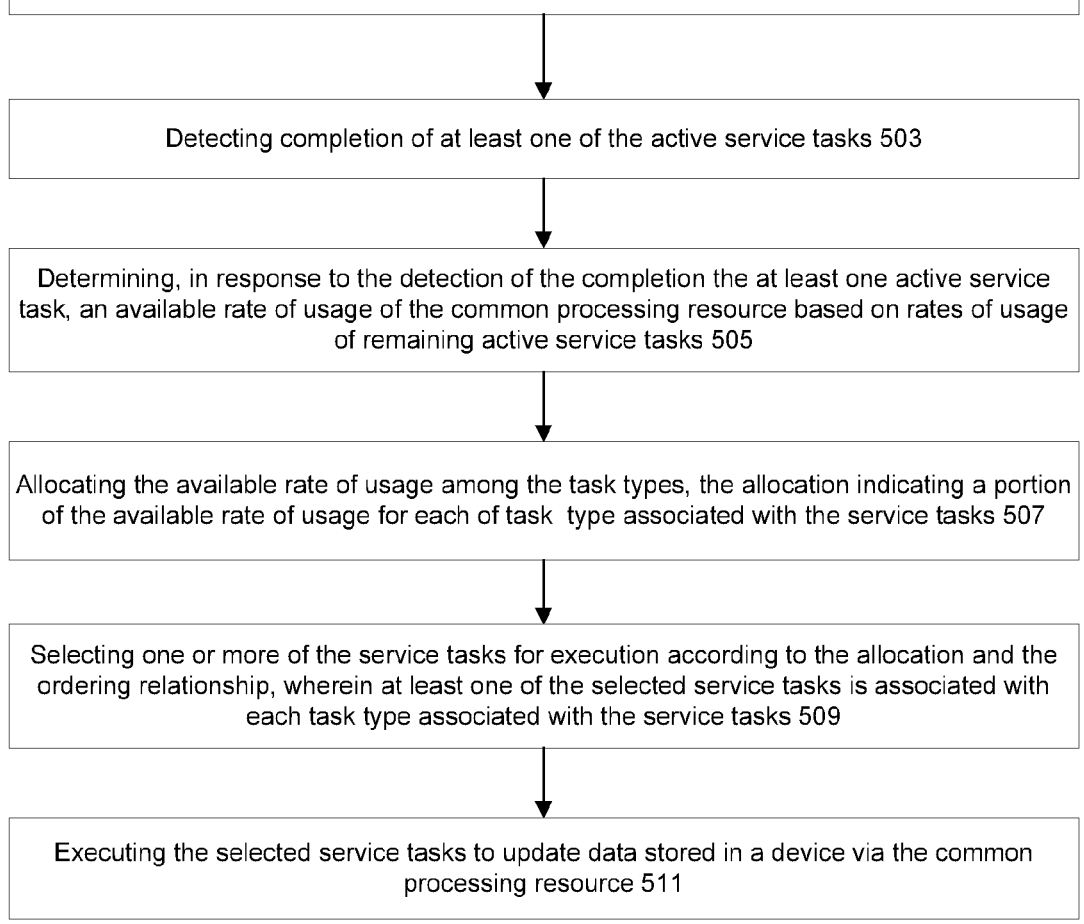
FIG. 5 is a flow diagram illustrating an alternative embodiment of a process to throttle tasks based on IO sizing according to one embodiment of the invention.

FIG. 5 is a flow diagram illustrating an alternative embodiment of a process to throttle tasks based on IO sizing. Exemplary process 500 may be performed by a processing logic that may include hardware (circuitry, dedicated logic, etc.), software (that will run on a dedicated machine), or a combination of both. For example, process 500 may be performed by some components of system 200 of FIG. 2. At block 501, for example, the processing logic of process 500 can maintain an ordering relationship among a plurality of service tasks to be executed.

In one embodiment, one or more active service tasks may be currently being executed. Execution of each service task may depend on a usage of a common processing resource. Each service task may have a rate of usage of the common processing resource. Each service task may be associated with one of a plurality of task types or possible task types. Each service task type is configured with a separate priority. The ordering relationship may be maintained according to priorities associated with the service tasks.

In some embodiments, the processing logic of process 400 may detect arrival of a particular service task. In response, the processing logic of process 400 may identify a particular priority associated with a task type of the particular service task. The processing logic of process 500 can update the ordering relationship for the service tasks and the newly arrived particular service task with the particular priority.

At block 503, the processing logic of process 500 can detecting completion of at least one of the active service tasks. For example, the processing logic of process 500 may receive a completion message indicating completion of service tasks which no longer require accessing the common processing resource. In response, at block 505, the processing logic of process 500 can determine an available rate of usage of the common processing resource based on rates of usage of remaining active service tasks which have not yet completed.

At block 507, the processing logic of process 500 may allocate the available rate of usage among the task types associated with currently running service tasks (which may or may not been executed to access the common processing resource). The determined allocation may indicate a separate portion of the available rate of usage for each task type associated with the currently running service tasks.

At block 509, the processing logic of process 500 can select one or more service tasks for execution according to the allocation determined. Alternatively or optionally, the selection of the service tasks may depend on an ordering relationship among the currently running service tasks. In one embodiment, at least one of the selected service tasks may be associated with each task type present in the currently running service tasks. The processing logic of process 500 may execute the selected service tasks to update data stored in a device via the common processing resource at block 511.

Figure 6:
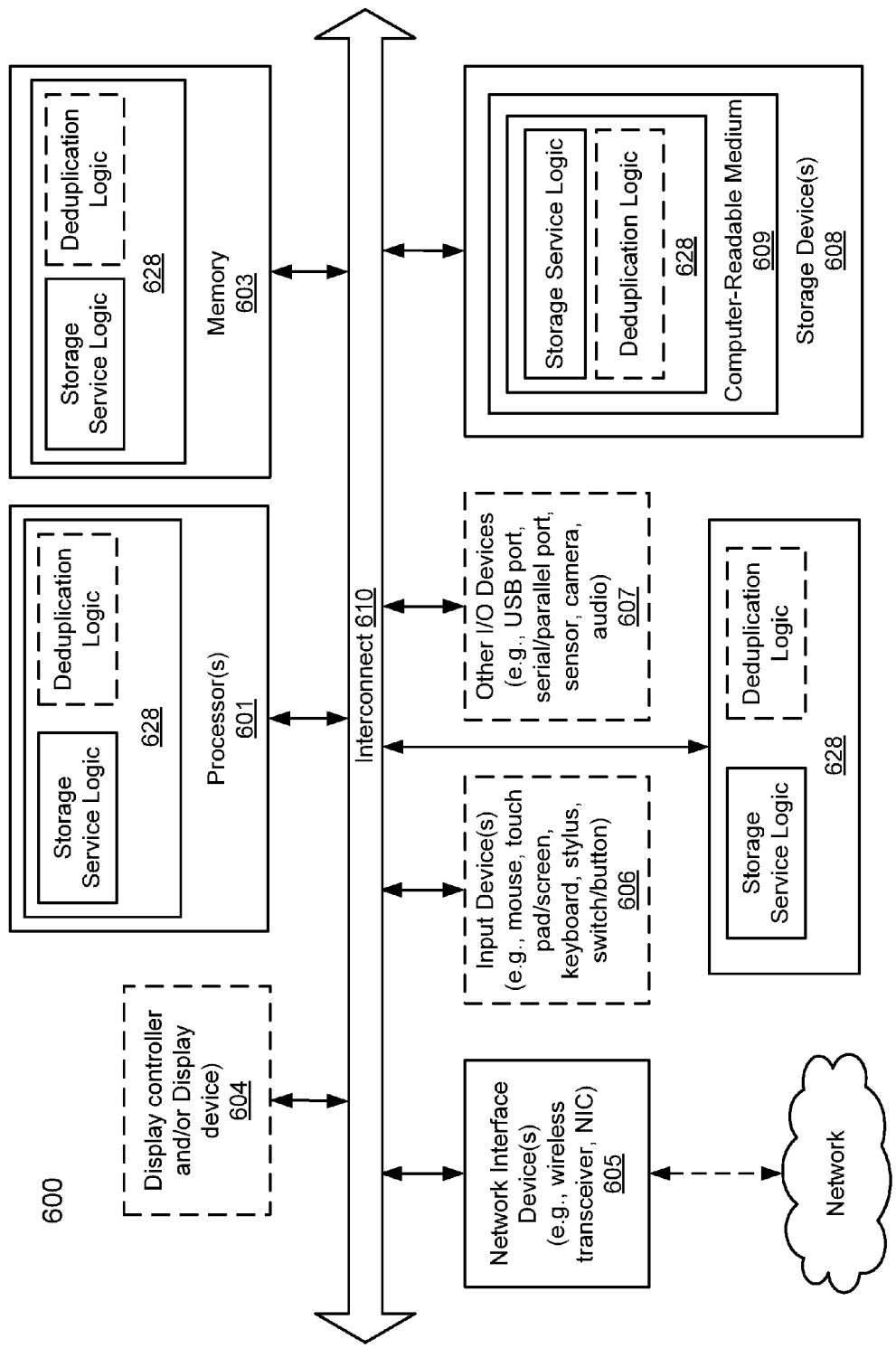
FIG. 6 illustrates one example of a typical computer system which may be used in conjunction with the embodiments described herein.

FIG. 6 is a block diagram illustrating an example of a data processing system which may be used with one embodiment of the invention. For example, system 600 may represents any of data processing systems described above performing any of the processes or methods described above. System 600 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 600 is intended to show a high level view of many components of the computer system. However, it is to be understood that additional components may be present in certain implementations and furthermore, different arrangement of the components shown may occur in other implementations. System 600 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 600 includes processor 601, memory 603, and devices 605-608 via a bus or an interconnect 610. Processor 601 may represent a single processor or multiple processors with a single processor core or multiple processor cores included therein. Processor 601 may represent one or more general-purpose processors such as a microprocessor, a central processing unit (CPU), or the like. More particularly, processor 601 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 601 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a coprocessor, an embedded processor, or any other type of logic capable of processing instructions.

Processor 601, which may be a low power multi-core processor socket such as an ultra-low voltage processor, may act as a main processing unit and central hub for communication with the various components of the system. Such processor can be implemented as a system on chip (SoC). Processor 601 is configured to execute instructions for performing the operations and steps discussed herein. System 600 may further include a graphics interface that communicates with optional graphics subsystem 604, which may include a display controller, a graphics processor, and/or a display device.

Processor 601 may communicate with memory 603, which in one embodiment can be implemented via multiple memory devices to provide for a given amount of system memory. Memory 603 may include one or more volatile storage (or memory) devices such as random access memory (RAM), dynamic RAM (DRAM), synchronous DRAM (SDRAM), static RAM (SRAM), or other types of storage devices. Memory 603 may store information including sequences of instructions that are executed by processor 601, or any other device. For example, executable code and/or data of a variety of operating systems, device drivers, firmware (e.g., input output basic system or BIOS), and/or applications can be loaded in memory 603 and executed by processor 601. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 600 may further include IO devices such as devices 605-608, including network interface device(s) 605, optional input device(s) 606, and other optional IO device(s) 607. Network interface device 605 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 606 may include a mouse, a touch pad, a touch sensitive screen (which may be integrated with display device 604), a pointer device such as a stylus, and/or a keyboard (e.g., physical keyboard or a virtual keyboard displayed as part of a touch sensitive screen). For example, input device 606 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 607 may include an audio device. An audio device may include a speaker and/or a microphone to facilitate voice-enabled functions, such as voice recognition, voice replication, digital recording, and/or telephony functions. Other IO devices 607 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 607 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 610 via a sensor hub (not shown), while other devices such as a keyboard or thermal sensor may be controlled by an embedded controller (not shown), dependent upon the specific configuration or design of system 600.

To provide for persistent storage of information such as data, applications, one or more operating systems and so forth, a mass storage (not shown) may also couple to processor 601. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 601, e.g., via a serial peripheral interface (SPI). This flash device may provide for non-volatile storage of system software, including a basic input/output software (BIOS) as well as other firmware of the system.

Storage device 608 may include computer-accessible storage medium 609 (also known as a machine-readable storage medium or a computer-readable medium) on which is stored one or more sets of instructions or software (e.g., module, unit, and/or logic 628) embodying any one or more of the methodologies or functions described herein.

Module/unit/logic 628 may also reside, completely or at least partially, within memory 603 and/or within processor 601 during execution thereof by data processing system 600, memory 603 and processor 601 also constituting machine-accessible storage media. Module/unit/logic 628 may further be transmitted or received over a network via network interface device 605.

Computer-readable storage medium 609 may also be used to store the same software functionalities described above persistently. While computer-readable storage medium 609 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 628, components and other features described herein can be implemented as discrete hardware components or integrated in the functionality of hardware components such as ASICS, FPGAs, DSPs or similar devices. In addition, module/unit/logic 628 can be implemented as firmware or functional circuitry within hardware devices. Further, module/unit/logic 628 can be implemented in any combination hardware devices and software components.

Note that while system 600 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is generally conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A machine-readable non-transitory storage medium having instructions therein, which when executed by a machine, cause the machine to perform operations comprising:

updating an ordering relationship among a plurality of service tasks, wherein execution of each service task depends on a usage of a common processing resource, each service task having a rate of usage of the common processing resource, each service task associated with one of a plurality of task types, wherein the common processing resource having an available rate of usage, wherein each task type has a priority, and wherein the ordering relationship is updated based on a combination of the priority and the usage rate of each service task;

determining an allocation of the available rate of usage among the task types, the allocation indicating a portion of the available rate of usage for each of task type associated with the service tasks;

selecting one or more of the service tasks for execution according to the allocation and the ordering relationship among the plurality of service tasks, wherein at least one of the selected service task(s) is associated with each task type associated with the service tasks;

executing the selected service task(s) to update data stored in a device via the common processing resource, wherein the device includes a storage component storing the data in a file system;

calculating a maximum resource usage associated with the file system, wherein the maximum resource usage indicates a maximum number of transactions per unit time associated with the file system; and dividing and distributing the maximum resource usage associated with the file system among the selected service task(s) in accordance with an ordering relationship among the selected service task(s).

2. The medium of claim 1, wherein the operations further comprise:

identifying the available rate of usage based on the maximum number of transactions with the file system per unit time.

3. The medium of claim 2, wherein the common processing resource includes an input/output interface to the device, and wherein the rate of usage represents a number of input/output requests to the input/output interface for the transactions.

4. The medium of claim 2, wherein the identifying comprises:

tracking the number of input/output requests dynamically during runtime, wherein the maximum number of transactions per unit time is determined based on a history of the number of input/output requests tracked.

5. The medium of claim 4, wherein zero or more service tasks are currently running, wherein the available rate of usage is inversely related to a sum of rates of usage associated with the currently running service tasks and wherein the available rate of usage is no more than a value determined by the maximum number of transactions per unit time.

6. The medium of claim 1, wherein the ordering relationship is updated dynamically while the selected service tasks are being executed.

7. The medium of claim 6, wherein the ordering relationship is directly related to the priority associated with each service task.

8. The medium of claim 6, wherein the ordering relationship is inversely related to the rate of usage of each service task.

9. The medium of claim 6, wherein where each service task is received for the execution at an arrival time, wherein the ordering relationship is updated based on the arrival time of each service task and wherein the ordering relationship is directly related to the arrival time of each service task.

10. The medium of claim 9, wherein the ordering relationship is updated in response to receiving at least one of the service tasks.

11. The medium of claim 1, wherein the determination of the allocation comprises:

maintaining an allocation table specifying target allocations of the available usage rate for different subsets of the plurality of task types, wherein the task types associated with the service tasks correspond to one of the subsets of the plurality of task types and wherein the allocation corresponds to a particular one of the target allocation for the one subset of the plurality of task types.

12. The medium of claim 11, wherein the target allocations depends on a measure of current working environment, wherein the portion is substantially evenly allocated among each task type associated with the service tasks if the measure indicates a work load of the current working environment below a threshold value.

13. The medium of claim 1, wherein the selected service tasks includes a number of service tasks of a particular task type associated with the service tasks, and wherein the selection comprises:

identifying the number of service tasks of the particular task type from the service tasks following the ordering relationship, wherein a combination of usage rates of the number of service tasks is constrained by a portion of the available rate of usage for the particular task type indicated in the allocation.

14. The medium of claim 13, wherein the combination includes a sum of the usage rates of the number of service tasks.

15. The medium of claim 1, wherein one or more service tasks are currently being executed, and wherein a particular one of the currently executed service tasks completes, the operations further comprising:

monitoring rates of usage of the common processing resources by the currently executed service tasks;

detecting completion of a particular one of the currently executed tasks, wherein the ordering relationship is updated in response to the detection of the completion of the particular one of the currently executed service tasks; and updating the available rate of usage based on the rates of usage monitored for remaining ones of the currently executed service tasks.

16. A computer-implemented method, the method comprising:

updating an ordering relationship among a plurality of service tasks, wherein execution of each service task depends on a usage of a common processing resource, each service task having a rate of usage of the common processing resource, each service task associated with one of a plurality of task types, wherein the common processing resource having an available rate of usage, wherein each task type has a priority, and wherein the ordering relationship is updated based on a combination of the priority and the usage rate of each service task;

determining an allocation of the available rate of usage among the task types, the allocation indicating a portion of the available rate of usage for each of task type associated with the service tasks;

selecting one or more of the service tasks for execution according to the allocation and the ordering relationship among the plurality of service tasks, wherein at least one of the selected service task(s) is associated with each task type associated with the service tasks;
executing the selected service task(s) to update data stored in a device via the common processing resource, wherein the device includes a storage component storing the data in a file system;
calculating a maximum resource usage associated with the file system, wherein the maximum resource usage indicates a maximum number of transactions per unit time associated with the file system; and
dividing and distributing the maximum resource usage associated with the file system among the selected service task(s) in accordance with an ordering relationship among the selected service task(s).

17. The method of claim 16, wherein the operations further comprise:
identifying the available rate of usage based on the maximum number of transactions with the file system per unit time.

18. The method of claim 17, wherein the common processing resource includes an input/output interface to the device, and wherein the rate of usage represents a number of input/output requests to the input/output interface for the transactions.

19. The method of claim 17, wherein the identifying comprises:
tracking the number of input/output requests dynamically during runtime, wherein the maximum number of transactions per unit time is determined based on a history of the number of input/output requests tracked.

20. The method of claim 19, wherein zero or more service tasks are currently running, wherein the available rate of usage is inversely related to a sum of rates of usage associated with the currently running service tasks and wherein the available rate of usage is no more than a value determined by the maximum number of transactions per unit time.

21. The method of claim 16, wherein the ordering relationship is updated dynamically while the selected service tasks are being executed.

22. The method of claim 16, wherein the determination of the allocation comprises:
maintaining an allocation table specifying target allocations of the available usage rate for different subsets of the plurality of task types, wherein the task types associated with the service tasks correspond to one of the subsets of the plurality of task types and wherein the allocation corresponds to a particular one of the target allocation for the one subset of the plurality of task types.

23. The method of claim 16, wherein the selected service tasks includes a number of service tasks of a particular task type associated with the service tasks, and wherein the selection comprises:
identifying the number of service tasks of the particular task type from the service tasks following the ordering relationship, wherein a combination of usage rates of the number of service tasks is constrained by a portion of the available rate of usage for the particular task type indicated in the allocation.

24. The method of claim 16, wherein one or more service tasks are currently being executed, and wherein a particular one of the currently executed service tasks completes, the operations further comprising:
monitoring rates of usage of the common processing resources by the currently executed service tasks;
detecting completion of a particular one of the currently executed tasks, wherein the ordering relationship is updated in response to the detection of the completion of the particular one of the currently executed service tasks; and
updating the available rate of usage based on the rates of usage monitored for remaining ones of the currently executed service tasks.

25. A computer system comprising:
a memory storing executable instructions;
a storage device storing data;
a processor coupled to the memory and the storage device to execute the instructions from the memory, the processor being configured to
update an ordering relationship among a plurality of service tasks, wherein execution of each service task depends on a usage of an interface to the storage device, each service task having a rate of usage of the interface, each service task associated with one of a plurality of task types, wherein the interface to the storage device having an available rate of usage, wherein each task type has a priority, and wherein the ordering relationship is updated based on a combination of the priority and the usage rate of each service task;
determine an allocation of the available rate of usage among the task types, the allocation indicating a portion of the available rate of usage for each of task type associated with the service tasks;
select one or more of the service tasks for execution according to the allocation and the ordering relationship among the plurality of service tasks, wherein at least one of the selected service task(s) is associated with each task type associated with the service tasks;
execute the selected service task(s) to update the data stored in the storage device via the interface, wherein the device includes a storage component storing the data in a file system;
calculate a maximum resource usage associated with the file system, wherein the maximum resource usage indicates a maximum number of transactions per unit time associated with the file system; and
divide and distribute the maximum resource usage associated with the file system among the selected service task(s) in accordance with an ordering relationship among the selected service task(s).

* * * * *